July 22, 1958
R. J. COSTANZO
2,844,698
CIGAR LIGHTERS
Filed Oct. 28, 1955
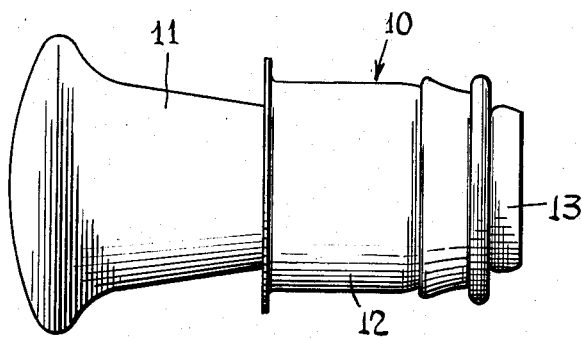
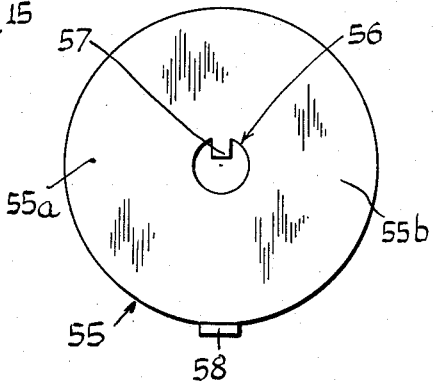
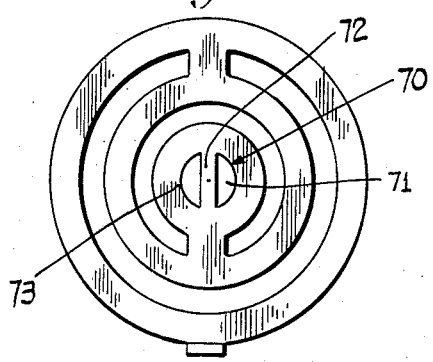
INVENTOR.
BY Raphael J. Costanzo United States Patent Office 2,844,698
Patented July 22, 1958

2,844,698

CIGAR LIGHTERS

Raphael J. Costanzo, Bridgeport, Conn.

Application October 28, 1955, Serial No. 543,301

5 Claims. (Cl. 219—32)

This invention relates to electrical cigar lighters and more specifically to an improved heating element thereof.

Heretofore, electric cigar lighters operating in a low voltage system as commonly used in automobiles, boats, airplanes and the likes have been provided with a heating element consisting of a flat wire wound in a spiral having spaced convolutions. However the use of such coils have several inherent disadvantages.

Chiefly among the disadvantages in the use of such coils is the relatively high cost in proportion to the cost of the lighter of manufacturing the heating element. Several distinct and independent operations and inspections were necessary to process the wire as supplied to a finished acceptable coil, all of which influenced the cost of the ultimate lighter. This was due to the large amount of labor, material handling and waste involved in each operation and inspection.

Generally, the wire in its raw state had to be first inspected to eliminate the kinked wire. Then the wire had to be wound to form the coil and this operation was usually accomplished by a relatively slow manual or semi-automatic operation. Because flat wire when wound in a spiral had a tendency to distort thereby causing shorting or arcing when energized, it was necessary to V the wire before winding in order to prevent such deformation. This constituted still a further operation, the cost of which had to be absorbed in the ultimate price of the cigar lighter.

Another disadvantage inherent in the spiral type heating element was that because of the closeness of the spaced convolutions, it was necessary to insulate each convolution from the other. This was usually accomplished by disposing a suitable insulating material between the convolutions or by utilizing a special wire formed of a suitable alloy material, such a Kanthal, which when heated formed an oxide; the oxidation thereof forming an oxide coat on the convolutions to insulate the same. In either case, an additional manufacturing step and inspection was required adding to the cost of which likewise had to be absorbed in the final selling price of the lighter.

In coil wire elements formed of an oxidizing material there exists the further disadvantage that in welding the coil to the igniter plug extreme care had to be exercised. For unless the weld was properly made, excessive oxidation would occur to form a high resistance joint. Consequently, proper flow of current to the coil was prevented. Therefore, the coil did not heat properly resulting in a rejected item. After the welding operation was completed it was still necessary to perform a "clearing" operation in order to clear the coil for shorts and the operation was performed manually. Thus in order to manufacture an acceptable wire coil type of heating element, a series of operations and inspections were required all of which greatly increased the ultimate selling price of the ligher.

And still another disadvantage of the prior known coil type element resides in that the cigar lighter as commonly used today in automobiles and the like have been tooled and constructed to be used in a six volt system, however, since the recent trend is in a change over to twelve volt system, the spiral coil had to be redesigned to fit the higher volt system without altering the physical dimensions of the lighter. As a result the increased voltage required the coil to have a greater number of convolutions. Because of the limitation of space on the lighter plug, the convolutions had to be more closely spaced. This greatly increased problem of short circuitting and arcing. Further the redesigned coil resulted in reduced mechanical strength and rigidity to such an extent that difficulty was had in maintaining the necessary spacing between convolutions. Therefore the coils tended to overheat, break and burn out.

An object of the present invention is to overcome the above disadvantages by providing an improved heating element which can be readily manufactured in a simple operation thereby greatly reducing amount of material handling, labor, waste and consequently the cost thereof.

Another object of the present invention is to provide a heating element which is made in the form of a sheet metal stamping quicky, simply and inexpensively.

A further object of this invention resides in an improved heating element having portions capable of carrying a divided current so that in the event a portion of the heating element is fractured, the lighter is not rendered completely ineffective.

A still further object of this invention is to provide for an improved heating element having portions thereof capable of carrying a divided current and having other portions connected thereto capable of carrying the full terminal current.

The foregoing objects according to this invention are accomplished by producing an integrally formed wafer-shaped heating element by a relatively simple stamping, punching or etching operation in which the stamped, punched or etched element is formed so that the current carrying portions thereof are spaced from each other by slotted portions, yet being integrally connected to form a rigid unit. As a result of this particular arrangement of the slots, the currents carrying portions of the element are arranged to carry a divided current. Terminal means are provided integrally therewith adjacent the center portion and outer periphery of the heating element for connecting the heating element to the sandard ignition plug commonly used today.

A feature of this invention resides in the provision of an improved heating element for use in a cigar lighter which requires no winding, oxidizing, clearing or other operations necessary in forming a coil type heating element.

Another feature of this invention resides in an improved heating element which can be simply stamped from a suitable blank of electrical conducting material to form a rigid, integrally formed heating element.

Still another feature of this invention resides in the provision that portions of the improved element provides sections for carrying a divided current.

Another feature of this invention resides in the provision that the novel heating element is rigidly formed and shaped so that distortion thereof is eliminated.

Another feature of this invention resides in the provision whereby the stamping of the improved heating element is readily adapted to automation and mass production.

Another feature of this invention resides in the provision that the improved heating element 's inexpensive to produce, simple in structure and positive in operation.

Other advantages and features will hereinafter appear.

In the drawings:

Figure 1 is a side elevational view of the removable igniter plug of a cigar lighter as commonly found in automobiles or the like.

Figure 2 is a front plan view of the igniter plug illustrating the improved heating element connected thereto.

Figure 3 is a detail side end view of the heating element of Figure 2.

Figure 4 is a plan view of a modified form of the invention, and

Figure 5 is a plan view of still another form of the invention.

Referring to the drawings, Figure 1 illustrates the removable unit 10 of an electric cigar lighter as commonly included in the assessory equipment of an automobile, boat, plane and the like. As shown, the unit 10 consists usually of a pull knob 11 and the igniter plug 12. Connected to the end of the plug 12 and insulated therefrom is the heating element retaining cup 13 with a rivet 14 disposed centrally of the cup 13 to secure the latter to the plug.

According to this invention there is disposed within the cup 13 an improved heating element or resistor 15. As illustrated in Figures 2 and 3, the resistor 15 consists of a relatively rigid, integrally formed element preferably made of Nichrome or other suitable electrical conducting material having a thickness of approximately 1/16 of an inch. However, depending on the particular design of the lighter and line voltage the thickness of the element may vary accordingly.

As shown in Figure 2, the resistor 15 consists of a disc-shaped member having a substantially circular central cutout portion to form an aperture 16 having a diameter slightly larger than that of the rivet. Thus as illustrated in Figure 2, the heating element 15 is adapted to be positioned within the cup 13 so that the rivet 14 is received in the aperture 16, while at the same time the resistor is spaced therefrom. A terminal 17 formed integrally thereon projects radially inwardly of the aperture and is connected in the slot or key 18 formed in the rivet by any suitable means such as welding, swaging or the like.

According to this invention in order to provide the resistor 15 with a plurality of current carrying sections, slots are provided to form therebetween current carrying sections. While the number of slots may vary, as illustrated in Figure 2, two such slots 19 and 20 are shown. Preferably these slots 19 and 20 are concentrically spaced about the aperture 16 wherein the closed ends thereof are oppositely disposed. By this particular arrangement three concentric current carrying sections 21, 22 and 23 are formed.

To integrally connect the current carrying sections 21, 22 and 23, the closed ends of the slots 19a and 20a have formed therebetween web or connecting portions 24, 25 which integrally joins portions 21, 22 and 23 together to form a rigid unit element 15.

A second terminal means 26 is integrally connected to the outer periphery of section 23. As shown, the terminal 26 is radiused so as to project at an angle to the disc so that it can be connected to the side wall 27 of the conducting metal cup 13 as by welding or the like. It will be noted that the terminals 17 and 26 are opposed and lie on the center line of the disc so that disc is preferably symmetrically formed about the center line of the element. This particular arrangement is to ensure that the element 15 becomes uniformly heated when the circuit is energized.

Because of the specific arrangement as above described, a novel circuit is produced. Thus as shown in the embodiment illustrated by Figure 2, it will be noted that current carrying sections 21, 22 and 23 in fact form parallel converging current carrying resistors 21a–b, 22a–b, and 23a–b, each carrying a divided current whereas the webs 24, 25 connecting portions 21, 22 and 23 are in series and carry the diverging full terminal current. In effect, the disk represents six resistors in parallel and four resistors including the terminals in series. This particular circuit is advantageous in that, if for any reason one or more of the resistor portions fracture, the heating element is not rendered completely inoperative as would be the case in the series wound coil type resistor heretofore known. Further, because of the shape and size of this improved resistor its manufacture is rendered suitable to stamping or other similar high speed type of manufacture and production; thereby greatly reducing the cost thereof.

Also, since the resistor or heating element of the present invention eliminates wound convolutions, it is no longer necessary to insulate portions thereof with an insulating material or to form the element of a specific alloy material, since the slots 19 and 20 formed in the disc provide sufficient insulation means for the current carrying portions 21, 22 and 23.

The embodiment illustrated in Figure 4 is directed to a simplified embodiment of the invention wherein the heating element 55 consists of a disk-shaped member having simply a central cut-out portion to form an aperture 56, and like that of element 15, the aperture 56 is provided with a diameter larger than that of the rivet so that the element can be spaced therefrom when in position on the plug. Terminal means 57 and 58 are provided and are constructed similar to those hereinbefore described and are connected to the rivet and cup in similar manner.

The element illustrated in Figure 4 differs from that of Figure 2, in that portions 55a and 55b in effect form only two parallel resistors, each of which carries a divided current between the terminals 56 and 57. Like resistor 15, the embodiment of Figure 4 can be likewise simply stamped and mass produced.

The form illustrated in Figure 5 is similar to that of Figure 2, except that the aperture 70 is provided with a smaller diameter so that the element fits snugly about the rivet 71, as shown the terminal portion 72 extends diametrically across the aperture 70 to fit the slot of the rivet. Thus when the terminal 72 is positioned in the slot, the inner portion 73 of the innermost ring can then be anchored directly to the center rivet 71 to form a more firm attachment of the element or resistor.

Thus according to the invention an efficient heating element is produced. The element is integrally formed from a suitable electrical conducting blank by a simple stamping operation to form a rigid element rendering it free from distortion. Further due to its particular configuration the element is connected so as to form a parallel circuit wherein portions thereof carry a divided current. As a result a fracture or injury to the element does not render it ineffective. Because of its rugged construction improved element is less likely to burn out, over heat or break. Further the element has sufficient mass to retain its heat for a substantial period of time.

Although the invention herein has been described in detail, it will be understood that the description thereof is intended to be illustrative rather than restrictive, as many structural details are susceptible to modification and change without departing from the spirit and scope of this invention.

I claim:

1. An electrical heating element comprising a flat, relatively thin, shaped wafer resistor having a center cut-out portion to form an aperture and a plurality of arcuate cut-out portions forming slots spaced about said aperture and each other to form an integral resistor having symmetrically spaced interconnecting current carrying sections forming alternately diverging and converging paths of resistance, and a pair of terminal means connected to said resistor, one of said terminal means being connected to the periphery of said aperture and said other terminal means being connected to the outer periphery of said resistor opposite said first terminal means, said pair of terminal means being adapted to connect to electrical conductors to connect said resistor thereto so that said resistance paths thereof form a combination series-parallel circuit in which the current is alternately divided and united as it flows through said resistor in passing from one conductor to the other.

2. A cigar lighter having a retaining cup and a rivet connected to said cup substantially centrally thereof, an electrical heating element adapted to be positioned in said cup, said element comprising a stamped, sheet metal disk having a center cut-out portion forming an aperture for receiving said rivet, said aperture having a larger diameter than said rivet so that said element is spaced therefrom, a plurality of concentrically spaced current carrying portions spatially disposed about said rivet, said current carrying portions carrying a divided current, web portion connecting said concentric current carrying portions, said web portions carrying the full terminal current, a first terminal means connecting the outer periphery of the outer most current carrying portion to said cup and a second terminal means connecting the inner periphery of said inner most concentric current carrying portion to said rivet to form a combination series-parallel circuit.

3. A heating element for attachment to the end of a removable igniting unit plug in an electric cigar lighter comprising a flat, metal disk having a terminal on its outer periphery and a second terminal on its center portion, said disc having a plurality of curved slots providing defining spaced circular concentric current carrying sections disposed in parallel, web portions located at the ends of said slots connecting adjacent concentric sections, said web portions carrying the full current passing through the terminals, and said concentric sections carrying a divided current, the sum of which equals the terminal current.

4. An improved, integrally formed, electrical heating element comprising a relatively thin, flat sheet material resistor having an aperture centrally thereof, a plurality of substantially concentrically, spaced current carrying portions disposed about said aperture, said current carrying portion being adapted to carry a divided current, web portion connecting adjacent current carrying portions, said web portions being adapted to carry the full terminal current, terminal means adapted to connect to electrical conductors whereby said resistor connected thereto forms a combination series-paralleled circuit in which the current flowing through the resistor is alternately divided and united in passing between conductors, said terminal means including a tab connected centrally of said resistor and a second tab connected to the outer periphery of said resistor.

5. An electrical heating element comprising a flat, integrally formed, resistor plate having a center cut-out portion forming an aperture for receiving an electrical conductor, and a plurality of concentrically spaced current carrying portions spatially formed about said aperture and forming spaces therebetween, said current carrying portions carrying a divided current, web portions across said spaces connecting adjacent concentric current carrying portions to one another, each of said web portions carrying the full terminal current and means connected to the outer periphery of the outer most concentric current carrying portion for connecting thereto another electrical conductor to form a combination series-parallel circuit in which the current flowing through the said resistor plate is alternately divided and united in going from one conductor to the other.

References Cited in the file of this patent

UNITED STATES PATENTS

| | | |
|---|---|---|
| 716,314 | Tuck et al. | Dec. 16, 1902 |
| 1,022,897 | Stevens | Apr. 9, 1912 |
| 1,235,853 | Spence | Aug. 7, 1917 |
| 1,253,575 | Clark | Jan. 15, 1918 |
| 1,260,252 | Apfel | Mar. 19, 1918 |
| 1,525,624 | Suter | Feb. 10, 1925 |
| 1,543,708 | Greenawalt | June 30, 1925 |
| 2,554,743 | Jones | May 29, 1951 |
| 2,640,861 | Kremens | June 2, 1953 |
| 2,701,296 | Crawford | Feb. 1, 1955 |
| 2,784,287 | Glynn | Mar. 5, 1957 |